Figure 1:
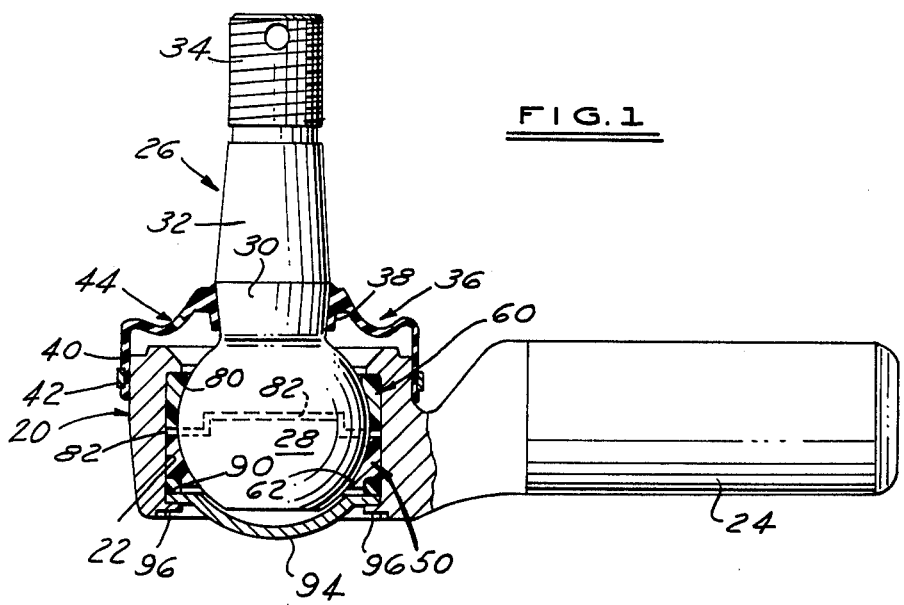

United States Patent [19]
Gaines et al.

[11] 4,076,344
[45] Feb. 28, 1978

[54] BEARING ASSEMBLY FOR A BALL AND SOCKET JOINT

[75] Inventors: Donald R. Gaines, Farmington; Jon M. Smallegan, Ann Arbor; William H. Trudeau, Brighton, all of Mich.

[73] Assignee: Gulf & Western Manufacturing Company, Southfield, Mich.

[21] Appl. No.: 684,392

[22] Filed: May 7, 1976

[51] Int. Cl.² .............................................. F16C 11/06
[52] U.S. Cl. ........................................ 308/72; 403/140
[58] Field of Search ........... 308/72; 403/140, 132–135

[56] References Cited
U.S. PATENT DOCUMENTS

| | | | |
|---|---|---|---|
| 3,259,408 | 7/1966 | Herbenar | 308/72 |
| 3,870,986 | 3/1975 | Oka et al. | 308/72 |
| 3,909,084 | 9/1975 | Snijar et al. | 308/72 |
| 3,934,953 | 1/1976 | Tooley | 308/72 |

*Primary Examiner*—Richard A. Bertsch
*Attorney, Agent, or Firm*—Barnes, Kisselle, Raisch & Choate

[57] ABSTRACT

A bearing assembly for a ball and socket type joint of the type using split bearing inserts interposed between a ball and a socket which includes interdigitally engaged bearing inserts installed in the assembly under the pressure of an elastic memory ring to provide the bearing load and a wear take-up, including clearance openings for lubricant dimensioned and positioned to coincide with access grooves to insure lubricant distribution.

9 Claims, 10 Drawing Figures

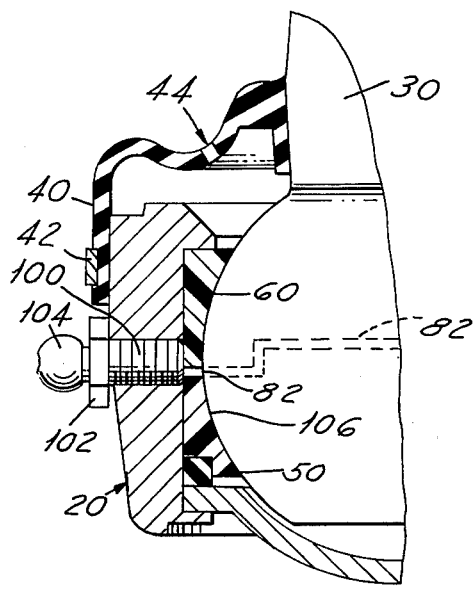
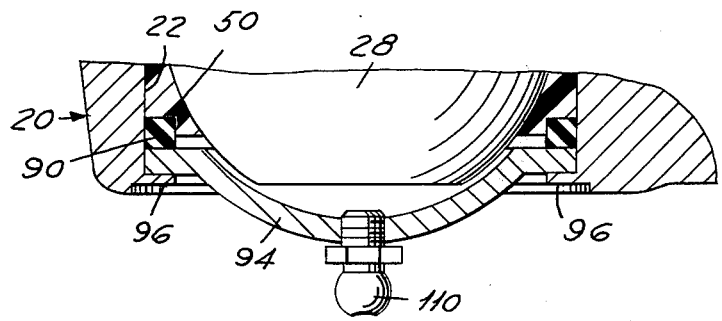
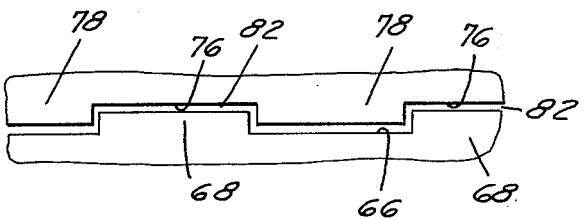

BEARING ASSEMBLY FOR A BALL AND SOCKET JOINT

This invention relates to a Bearing Assembly for a Ball and Socket Joint and more particularly to a ball and socket joint structure which is so constructed that it may have alternate uses either for a "lubricate for life" bearing or a bearing which receives lubricant periodically through suitable fittings. In a U.S. Pat. No. 3,578,366 to Snidar, dated May 11, 1971, there is disclosed a long-life, self-lubricating bearing with bearings inserts interdigitally joined at the equatorial surfaces of the ball to provide a plastic recess for the ball.

The joint disclosed in the above-referenced patent is intended to be not lubricated throughout its life since it is built for a long life on a standard vehicle. In some cases, however, it is desirable that a bearing, which is to have extremely hard use on what is called "off road" vehicles operating in sand and mud, be designed to be lubricated so that the lubricant contained therein may be purged periodically and renewed.

It is also desirable that the bearing assembly be subject to a continuing pressure so that it does not loosen up and become sloppy if wear of the bearing surfaces takes place. In some instances, this take-up has been accomplished by adjustable screw rings such as shown in a U.S. Pat. No. 3,524,664 to Schueblein, dated Aug. 18, 1970. In other instances, a heavy spring has been utilized to keep a load on the bearing such as shown in a U.S. Pat. No. 3,391,952 to Ziegler, dated July 9, 1968. The U.S. Pat. No. 3,362,735 to Maxeiner, dated Jan. 9, 1968, utilizes a grooved pressure ring to seal-in lubrication and seal out dirt.

It is an object of the present invention to provide, in a composite bearing combination, a versatile construction which can provide the necessary bearing inserts arranged in a manner to facilitate assembly wherein the same parts with the same assembly equipment and the same boring tools and assembly tools can be utilized to provide either a ball joint which is sealed for life or a ball joint which is adaptable to purging lubrication at intervals during its life.

It is, therefore, an object of the present invention to provide a simplified bearing construction which provides a long-life pressure take-up element and one which has interdigital inserts overlapping each other at the equator of the ball joint and so spaced in this area that lubricant may reach the interior surface of the bearing inserts and the exterior surface of the ball.

It is a further object to provide a bearing seal which will release lubricant pressure when desired to prevent the build-up of undue internal pressure.

Other objects and features of the invention relating to details of construction and operation will be apparent in the following descriptions and claims in which the principles of the invention are set forth together with the best mode presently contemplated for the practice of the invention.

Drawings accompany the disclosure and the various views thereof may be briefly described as:

FIG. 1, a sectional view of the bearing in assembly.

Figure 2:
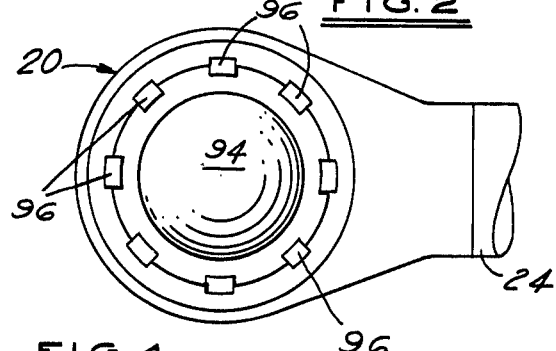

FIG. 2, an end view of the bottom of the bearing as assembled.

Figure 3:
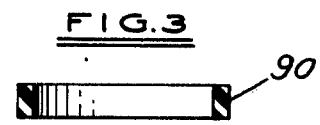

FIG. 3, a view of a pressure element in unassembled dimension.

Figure 4:
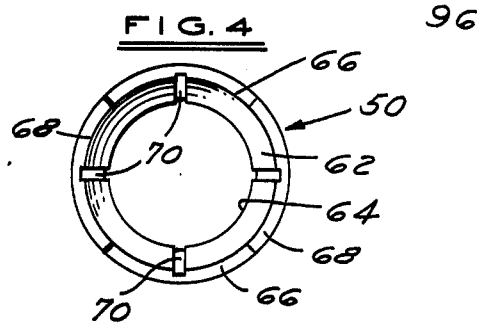

FIG. 4, a top view of one of the bearing rings.

Figure 5:
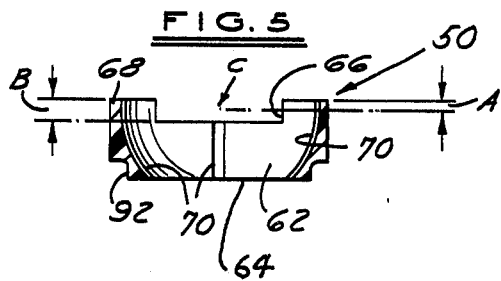

FIG. 5, a sectional view of the bearing ring shown in FIG. 4.

Figure 6:
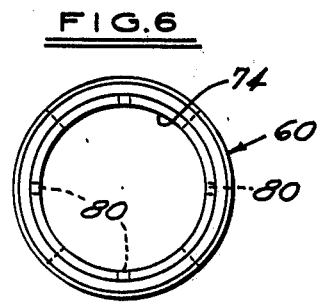

FIG. 6, an end view of a second bearing ring.

Figure 7:
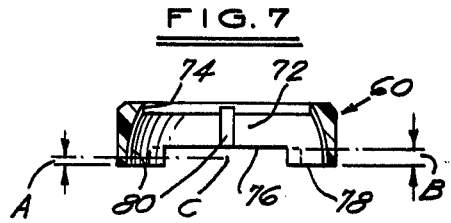

FIG. 7, a sectional view of the second bearing ring.

FIG. 8, a sectional view of a portion of the assembly showing a lubricant fitting at the side of the joint.

FIG. 9, a sectional view of a portion of the assembly showing a lubricant fitting at the bottom of the assembly.

FIG. 10, a layout or unwrapped view of the insert showing the interdigital joints.

REFERRING TO THE DRAWINGS

A ball and socket joint assembly is shown in FIG. 1 wherein the socket member 20 has a cylindrical recess 22 supported on the end of a shank 24. A ball stud 26 has a ball element 28 formed on the end thereof with an inwardly tapered shank portion 30 directly adjacent the ball and an outer tapered portion 32 leading to the threaded end 34 of the ball stud.

A flexible seal collar 36 is provided at the top of the assembly having a neck portion 38 which is received on the tapered portion 30 and a skirt portion 40 retained by a ring 42 on the top of the socket member 20. This seal member 36 has a series of U-shaped cuts to provide flaps 44 around the periphery between the neck and the skirt which allow egress of pressure within the assembly and also of lubricant if it is introduced by a suitable lubricant fitting. There are two bearing elements interposed between the wall of the recess 22 and the outer surface of the ball. The bottom element 50, as viewed in FIG. 1, is shown in FIGS. 4 and 5; and the top element 60, as shown in FIG. 1, is illustrated in FIGS. 6 and 7.

With reference to FIG. 4, the bottom element 50 has a spherical surface 62 which terminates in a bottom opening 64. The equatorial portion of the insert 50 has two opposed recesses 66 around the circumference which provides alternate recesses 66 and upward projections 68. There are provided four equally spaced latitudinal lubricant grooves 70 around the spherical surface 62. The top element 60 of the assembly has a spherical surface 72 and a top opening 74. The bottom edge of this unit also has recesses 76 which alternate with projections 78, and this element is also provided with latitudinal lubricant grooves 80 in the spherical surface 72.

It will be noted that the point C in FIGS. 5 and 7 designate the center of the ball in its relationship to the parts 50 and 60. This point C lies on a line which is spaced from the top of the projections 68 in FIG. 5 and 78 in FIG. 7 by dimension A. The depth of the recesses 66 and 76 is indicated by a dimension B. The dimensions A and B are related to each other in such a way that the top of a projection 68, for example, will not seat in the bottom of the recess 76 and, similarly, the projection 78 will not seat in the recess 66. Thus, there is a small groove which is remaining which provides access to the interior of the joint at 82 as shown in FIG. 1.

The parts are assembled as shown in FIG. 1 so that the grooves 82 extend around the equatorial portion of the interlocked members 50 and 60 in staggered relationship. In FIG. 3, a compressible axial load ring 90 is shown which is made of a resilient material, for example, polyurethane such as Mobay E 364, having a high degree of memory so that when axial load ring 90 is interposed into the annular groove 92 at the bottom of bearing insert 50 and assembled under pressure, it will be compressed axially to the point shown in FIG. 1.

Prior to compression the cylindrical or axial dimension of ring 90 is preferably about twice the axial depth of annular groove 92 in bearing insert 50. In assembling the joint, load ring 90 is compressed by forcing the domed-disc 94 into position and staking it at 96. Thus, the parts are assembled under pressure and this pressure will be maintained over a long period of use by the resilience of the axial load ring 90.

The device shown in FIG. 1 can be used for a lifetime lubricated joint wherein the lubrication is either impregnated into the rings 50 and 60 or packed into the openings in the assembly without any intention of additional lubrication being added during the life of the part. In this structure there would be no relief flaps in the seal element 36.

In FIG. 8, a lubrication fitting is shown in the wall of the socket member 20 having a screw portion 100 which threads into the wall with a small wrench flange 102 and the usual global fitting 104. It will be noted that the opening 106 in the wall of the socket 20 is wide enough that it can span the grease clearance groove 82 regardless of its orientation around the equator of the assembly. Thus, regardless of the rotative relationship, the opening 106 will always be in registry with one of the grooves 82. The relationship of these grooves around the periphery is shown best in FIG. 10 where there is a layout view.

In FIG. 9, a grease fitting is shown at 110 in the bottom of the dome-shaped disc 94. The position of the grease fitting will depend on the particular assembly. When positioned at the side of the socket as shown in FIG. 8, the grease will enter the grooves 82 and pass around the ball through the latitudinal grooves 70 and 80 in the bearing inserts. Thus, the lubrication can reach each end of the ball and can fill the space underneath the seal element 36. It may also move out of the optional flap portions 44 if the pressure is excessive in the assembly. This will prevent dislodgment of the seal out of proper relationship by the internal pressure. If the bottom lubricant fitting 110 is used, the lubricant can pass through the latitudinal grooves 70 of the bottom bearing element 50 and up to the circumferential grooves 82 and thence through the latitudinal grooves 80 at the top ring.

The bearing rings 50 and 60 can be made from high density plastics such as nylon, Teflon or Delrin which have good bearing characteristics or perhaps even from powdered metal bearing inserts which are to some degree porous for the retention of lubricant.

We claim:

1. In a joint assembly with a socket member having an opening therethrough with a substantially cylindrical recess therein, a stud member with a ball received in said recess and a stud projecting therefrom through said opening to the exterior of said socket member, a seal member of a flexible material engaging both said stud and said socket member and constructed and arranged to provide a seal therebetween, and a pair of bearing rings substantially coaxially received in said recess and constructed and arranged to provide a bearing assembly surrounding and having a spherical surface bearing on a relatively large equatorial area of said ball between the polar regions thereof with interdigitating recesses and tongues overlapping the equator of said ball and having a sufficient thickness to substantially fill the space between said recess and said ball, the improvement comprising said seal member also being constructed and arranged to define in cooperation with said socket member a lubricant reservoir adjacent said ball, said recesses and tongues of said bearing rings being constructed and arranged to define in cooperation with said ball a staggered lubricant passage extending around and opening onto the equatorial region of said ball, at least the one of said bearing rings adjacent said seal member having at least two circumferentially spaced grooves extending generally axially across said ring, opening onto said ball, and connecting said staggered passage with said lubricant reservoir defined at least in part by said seal member such that a lubricant received in said lubricant reservoir can be supplied to the interface of said ball with said spherical surface of said bearing assembly through said generally axially extending grooves and said staggered lubricant passage, one of said bearing rings having an annular recess at an axially outer end and a radially outer surface thereof for receiving a load ring, a load ring of a compressible and resilient material received in said annular recess and extending generally axially beyond the outer end of said ring containing said annular recess, and means carried by said socket member and compressing said load ring into said annular recess so as to yieldably urge said bearing rings toward each other and into firm engagement with said ball whereby the joint assembly has wear take-up compensation.

2. In a joint assembly as defined in claim 1 the improvement which further comprises at least two circumferentially spaced grooves extending generally axially across the other of said bearing rings, opening onto said ball, and communicating with said staggered passage so as to supply a lubricant to the interface of at least part of the spherical surface of said bearing assembly with said ball.

3. In a joint assembly as defined in claim 1 the improvement wherein each of said bearing rings is circumferentially continuous.

4. In a joint assembly as defined in claim 1 the improvement wherein said staggered passage is generally circumferentially continuous.

5. In a joint assembly as defined in claim 1 the improvement further comprising a grease fitting carried by said socket member and communicating with said staggered passage for supplying grease thereto.

6. In a joint assembly as defined in claim 1 the improvement further comprising a closure cap carried by said socket member and spanning and closing an opening of said recess in said socket member with said load ring being axially compressed between its associated bearing ring and said closure cap.

7. In a joint assembly as defined in claim 6 the improvement wherein said bearing ring adjacent said closure cap also has at least two circumferentially spaced grooves therein extending generally axially thereacross, opening onto said ball, and communicating with said staggered passage so as to supply a lubricant to the interface of at least part of the spherical surface of said bearing assembly with said ball.

8. In a joint assembly as defined in claim 7 the improvement which also comprises a grease fitting mounted on said closure cap and communicating with said space between said closure cap and said ball so as to permit grease to be supplied through said grease fitting to said axial grooves and staggered passage.

9. In a joint assembly as defined in claim 6 the improvement further comprising said load ring bearing on both said closure cap and the wall of said substantially cylindrical socket member to provide a seal between said socket member and said closure cap.

* * * * *